Sept. 15, 1953
A. K. PETERSON
2,652,308
CABINET CONSTRUCTION
Filed March 24, 1950
3 Sheets-Sheet 1
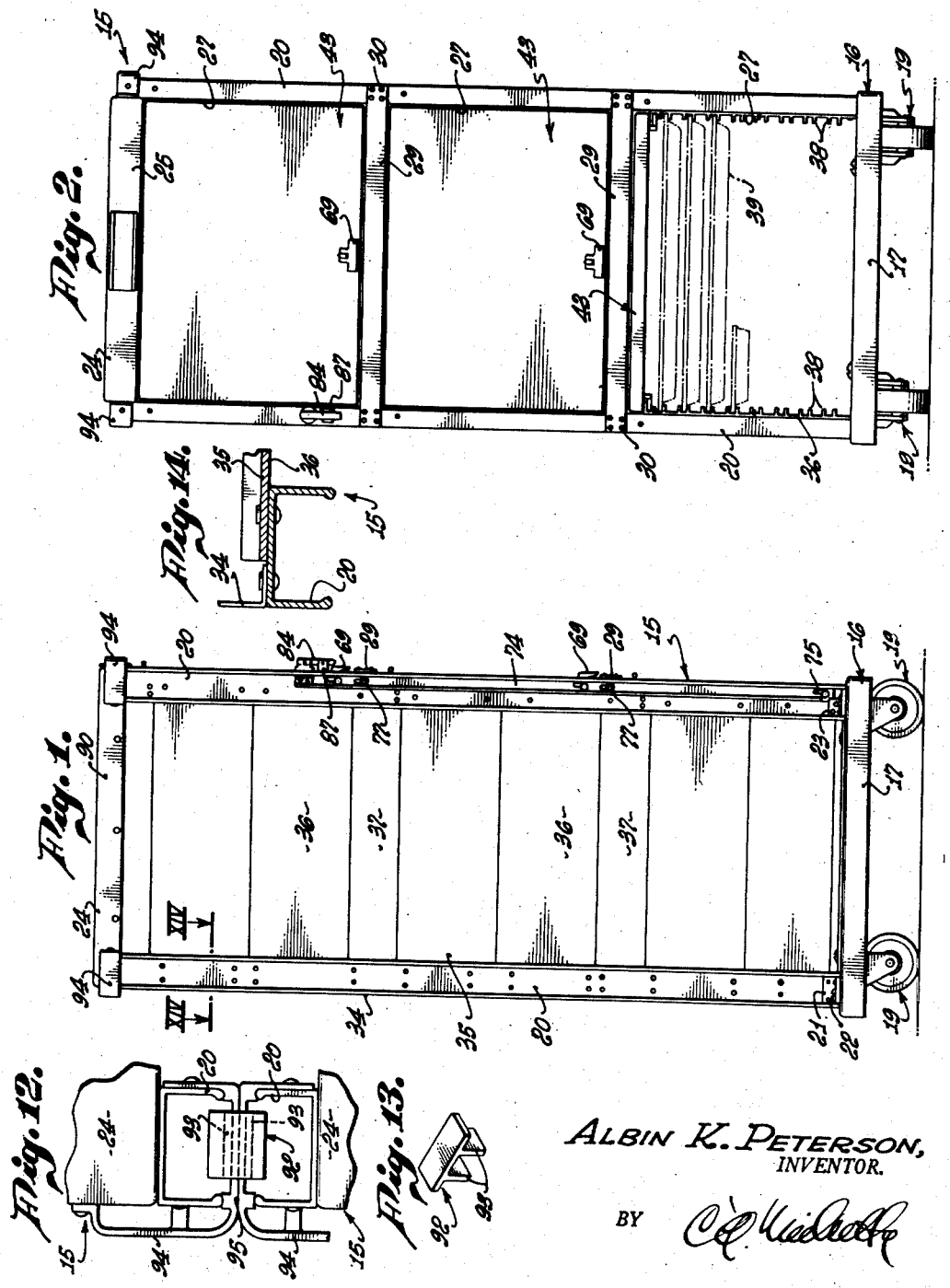
ALBIN K. PETERSON,
INVENTOR.
BY
ATTORNEY.

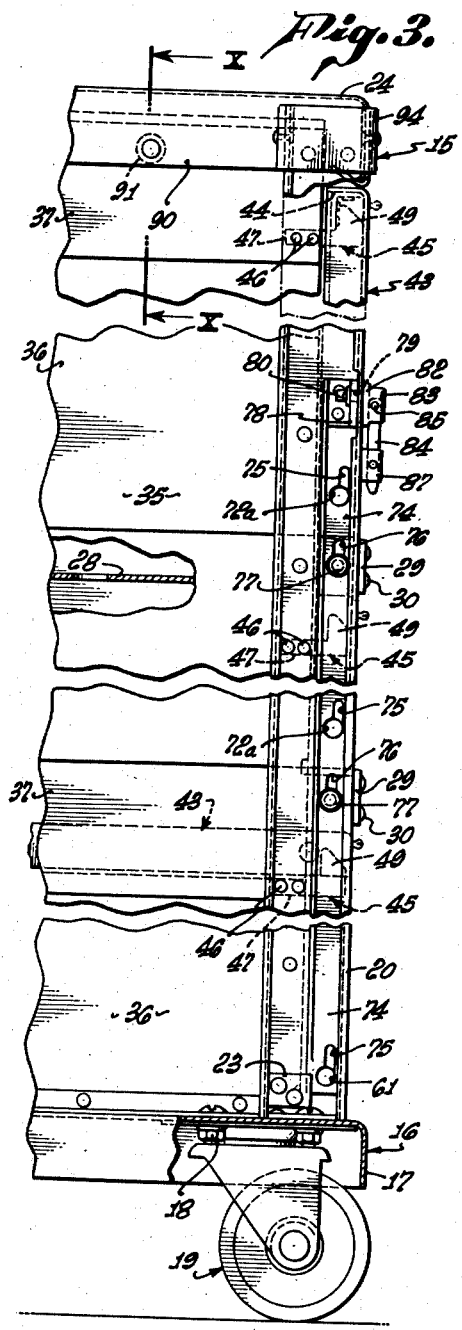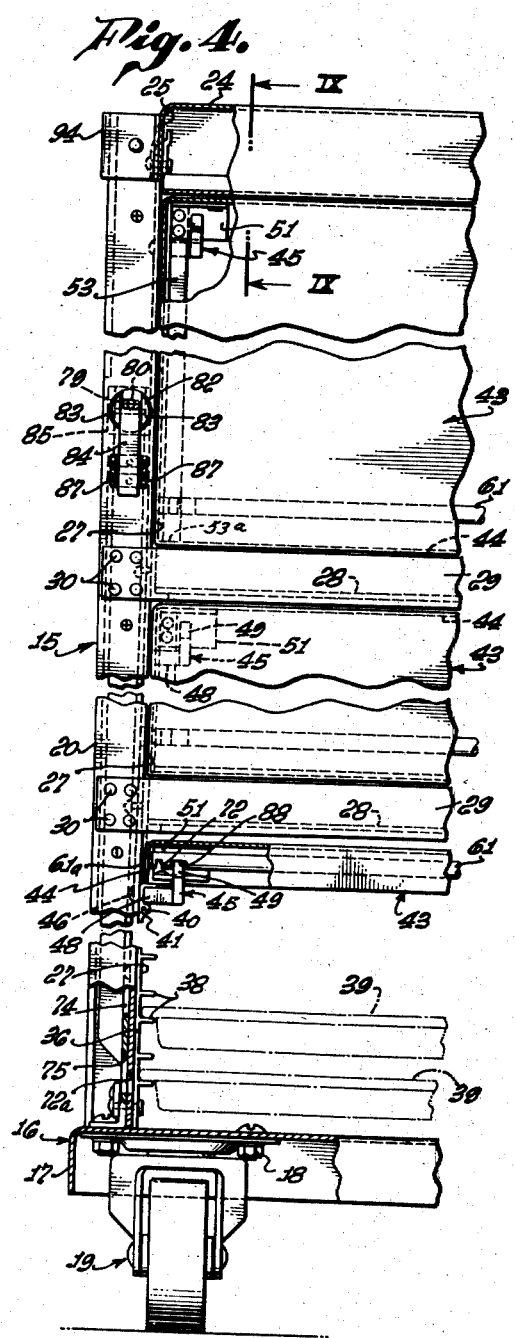

Sept. 15, 1953　　　A. K. PETERSON　　　2,652,308
CABINET CONSTRUCTION
Filed March 24, 1950　　　　　　　　　　　3 Sheets-Sheet 3
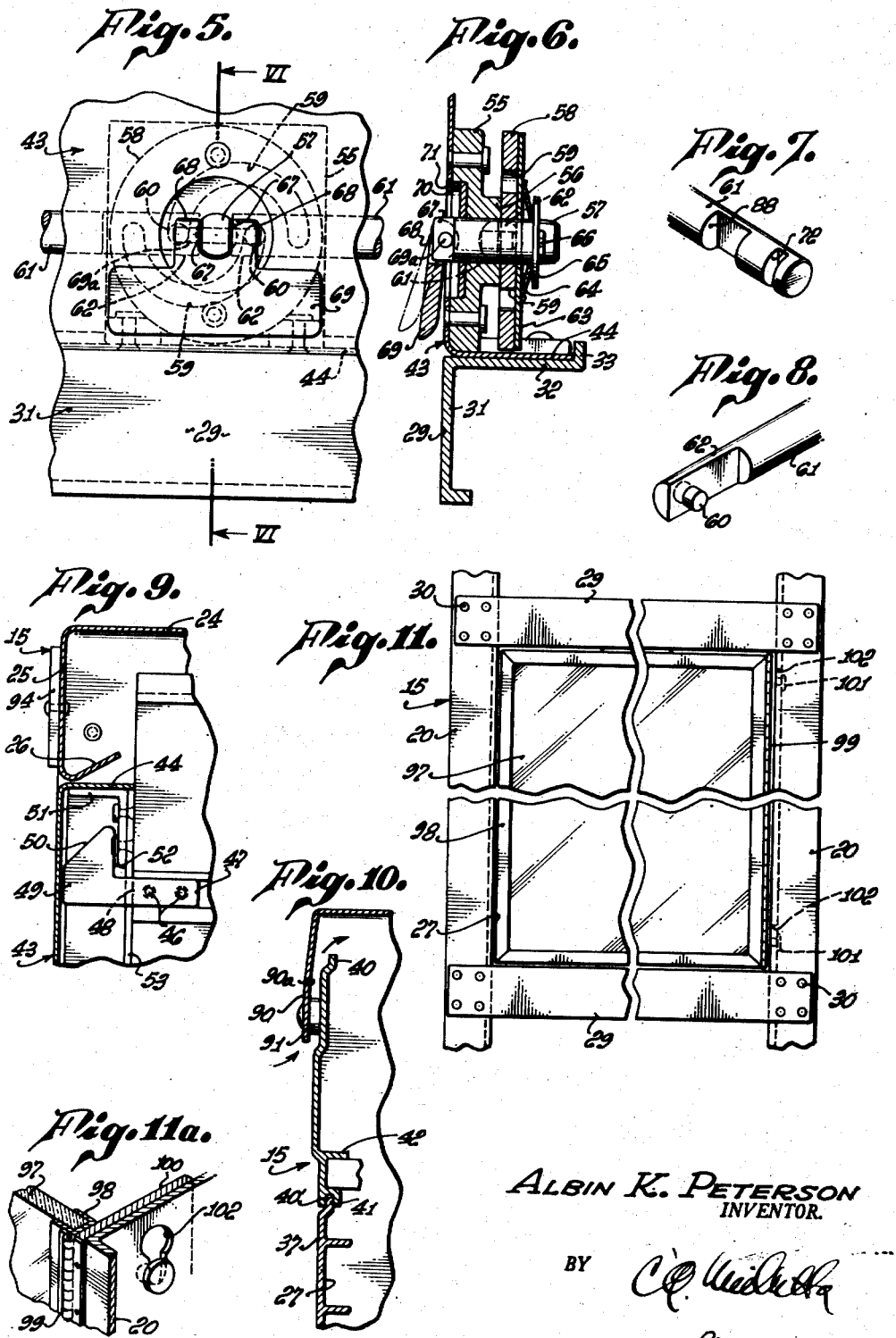
ALBIN K. PETERSON
INVENTOR.
BY
ATTORNEY.

Patented Sept. 15, 1953

2,652,308

UNITED STATES PATENT OFFICE 2,652,308

CABINET CONSTRUCTION

Albin K. Peterson, Redondo Beach, Calif.

Application March 24, 1950, Serial No. 151,599

7 Claims. (Cl. 312—311)

This invention relates to a cabinet construction and, more particularly, to a cabinet especially adapted and designed for facilitating the transportation, delivery and display of bakery goods, such as pies, cakes, and the like.

Present methods of delivering bakery goods from a commercial bakery to a retail bakery store require considerable manual handling of the goods. In addition to the handling during delivery, the bakery goods may often again be rehandled in the retail bakery store in order to place the bakery goods in suitable display counters or cabinets. Obviously, the more often bakery goods are handled, the greater is the danger of damaging the goods and rendering them unsalable.

Bakery goods, such as pies and cakes, require particularly careful handling. One present method of handling pies includes manually stacking the pies in groups of four to eight pies at the commercial bakery, carrying a stack of pies to the delivery truck, placing the pies individually on closely spaced shelves provided in the truck, removing the pies from the shelves and again stacking them for carrying the pies into a bakery retail store. The delivered pies are then usually placed in a suitable display counter by the operator of the retail store. In some instances, portable pie racks capable of carrying from six to twelve pies in a stack are provided for facilitating the manual carrying of pies at one time to and from a delivery truck. It is evident that the possibility of damaging pies delivered by the above method is very great.

When pies or other bakery goods are transported for delivery under the above methods and when delivery trucks of well known form are employed, the goods are not adequately protected against theft during a delivery stop, or during an unexpected stop. It has been found that if a driver leaves his truck unattended for only a few moments, petty thievery of pies and cakes has amounted, over a year's time, to thousands of dollars for some large commercial bakeries.

In view of the considerable handling of bakery goods and their exposure to petty thievery during delivery, there is obviously an urgent need for some means which will reduce manual handling of the bakery goods to a minimum during delivery from a commercial bakery to a retail store and which will carry and transport the goods in such a manner that they are protected against damage and also protected against petty thievery.

Therefore, the primary object of this invention is to provide an easily portable, attractive, light-weight cabinet which may be utilized in such a manner that handling of the goods is reduced to a minimum, that the goods are carried in a protected manner against both damage and petty thievery, and that the cabinet is arranged to permit display of the bakery goods in a retail bakery store without further handling of the goods carried therein.

An object of this invention is to design and provide a bakery cabinet which may be readily moved into a truck for transportation and wherein adjacent similar cabinets carried in the truck are readily releasably interlocked together for transportation as a unitary assembly.

Another object of this invention is to design and provide a bakery cabinet wherein a plurality of compartments are provided, each compartment having means for adjustably spacing trays carried therewithin and wherein the closure means for each compartment is adapted to securely hold the trays in their proper relative positions for preventing movement thereof during transportation which might cause damage to the bakery goods carried thereby.

A further object of this invention is to provide a portable bakery cabinet wherein the bakery goods may be readily displayed for sale without removal of the goods from the cabinet.

This invention contemplates a bakery cabinet such as that described above wherein each compartment is provided with a door which is adapted to be locked in closed position and wherein all the doors to the compartments may be locked by a common securing means.

This invention also contemplates a cabinet construction such as that described above wherein means are provided in the cabinet for permitting circulation of air therethrough to maintain the goods in a fresh and salable condition.

A further object of this invention is to design and provide a cabinet construction of the type described above wherein the doors for each compartment are adapted to be mounted flush with the plane of the front of the cabinet when in closed position, and when in open position the doors are adapted to be disposed in overhead horizontal position for economy of space within the compartment and with the forward edge of the door flush with the plane of the front of the cabinet.

A still further object of this invention is to design and provide a cabinet construction such as that described above wherein a novel, improved locking means is provided for each door which is readily operable and which does not interfere with the flush mounting of the door as described above.

This invention contemplates a cabinet constructed and arranged so as to embody many advantages which are particularly desirable in a cabinet for transporting and displaying bakery goods and as specifically described hereinafter.

Other objects and advantages of this invention will be readily apparent from the following description of the drawings.

In the drawings:

Fig. 1 is a side elevational view of a bakery cabinet embodying this invention.

Fig. 2 is a front view of the cabinet shown in Fig. 1.

Fig. 3 is a fragmentary, enlarged, side elevation of the forward portion of the cabinet shown in Fig. 1.

Fig. 4 is an enlarged, fragmentary view of the left half of the cabinet shown in Fig. 2, the door to the lower compartment being shown in open position and in partial section.

Fig. 5 is an enlarged, fragmentary, front view of the locking means for each compartment door.

Fig. 6 is a fragmentary, enlarged, sectional view of the locking means shown in Fig. 5, the section being taken in a vertical plane indicated by the line VI—VI of Fig 5.

Fig. 7 is a fragmentary, enlarged view of one end of a locking bar used with the locking means shown in Fig. 5.

Fig. 8 is a fragmentary, enlarged, perspective view of the other end of the locking bar used with the locking means shown in Fig. 5.

Fig. 9 is a fragmentary, enlarged, sectional view taken in a vertical plane indicated by the line IX—IX of Fig. 4.

Fig. 10 is an enlarged, fragmentary sectional view taken in a vertical, transverse plane indicated by the line X—X of Fig. 3.

Fig. 11 is an enlarged, fragmentary view of the front of one compartment of the cabinet illustrating a removable, transparent door closure permitting display of the goods within the compartment.

Fig. 11a is a fragmentary perspective view in section of the removable door arrangement of Fig. 11.

Fig. 12 is a fragmentary top plan view of means for interlocking two adjacent cabinets.

Fig. 13 is a perspective view of a V-shaped member for securing adjacent cabinets together.

Fig. 14 is a fragmentary sectional view taken in the plane indicated by line XIV—XIV of Fig. 1.

Referring to the drawings, the embodiment of a rigidly constructed, light-weight cabinet for transporting and displaying bakery goods as shown comprises an upstanding, generally rectangular cabinet of slightly greater depth than width, indicated in its entirety by 15, and preferably made of any light weight metal alloy material, such as aluminum or magnesium. In general the cabinet illustrated includes a plurality of vertically arranged compartments, each provided with means for supporting a plurality of trays for carrying bakery goods and with a flush-mounted door capable of being moved into an overlying horizontal position in the upper portion of the compartment for permitting display and removal of bakery goods contained within the compartment.

The cabinet 15, being of light weight, is easily portable and may be stocked with goods at a commercial bakery, placed upon a truck, and then removed from the truck to a retail bakery store where the cabinet may be used to display the goods without further handling of the bakery goods.

The cabinet 15 comprises a rectangular, flat base or bottom plate 16 provided with depending flanges 17 formed around the periphery of the plate, said flanges serving to provide a rigid base plate. Adjacent each corner of the base plate and secured by suitable nut and bolt assemblies 18 to the bottom surface thereof is a wheel and caster assembly generally indicated at 19. The wheels of the caster assemblies are of sufficient diameter to facilitate movement of the bakery cabinet over rough surfaces so that the cabinet may be easily wheeled on and off a truck.

At each corner of the base plate is secured an upstanding column or post 20 formed of channel section for rigidity. As best seen in Figs. 1 and 2, the channel sections are faced outwardly in opposite directions from the sides of the cabinet. The outward facing of posts 20 affords convenient handholds for the entire height of the cabinet at both front and rear thereof for facilitating handling of the cabinet. The two rear posts 20 may be connected to base plate 16 by angle clips 21 secured by rivets to the web of the post within the channel legs and by bolt and nut assemblies 22 to base plate 16. The front posts are secured in similar manner except that the left front post (as viewed in Fig. 1) is secured by an angle clip 23 which extends only partially between the channel legs in order to afford space for an end of a locking bar as described in detail hereinafter.

It should be noted that the outer edges of the channel legs of posts 20 are spaced slightly inwardly of the plane of the depending flanges of the bottom member to allow the flanges to act as bumping means for contact against adjacent similar cabinets or other articles to afford protection against damage to the cabinet while being handled. Also when cabinets are aligned in adjacent relationship the spacing thus provided between edges of opposed channel legs of posts 20 permits obtaining a hand-hold on the cabinet for separating one cabinet from another.

A top plate 24 of slightly smaller rectangular section than the base plate 16 extends between and is secured to inner faces of the upper ends of posts 20. The top plate 24 is provided with depending peripheral flanges 25, the front depending flange having an inwardly bent and upwardly directed extension 26 for cooperation with the top compartment door, as described later.

The cabinet may be divided into three compartments 27, disposed one above the other, and defined by transversely extending horizontal bulkheads 28 and crossmembers 29 extending between front posts 20 and defining with said posts, door openings. The bulkheads 28 may be made of sheet metal secured in any convenient manner to posts 20 and provided with lightening openings in order to reduce the weight thereof. The bulkheads 28 serve to brace and position posts 20 and provide great rigidity in the cabinet construction.

The cross members 29 are secured to the forward legs of the channel columns by means of rivets 30 and may comprise virtually an angle section having a vertical front leg 31 and a horizontal inwardly extending leg 32. The horizontal leg 32 may be provided with an upstanding vertical lip 33 extending along its inner edge for positioning a door as later described.

A rear wall 34 (Fig. 14) for the cabinet may be formed of a single, elongated rectangular sheet or plate of metal secured in any convenient manner as by inwardly flanged side edge margins riveted to the rear posts 20.

Side walls 35 for the cabinet may comprise a plurality of horizontal panels 36 and 37 arranged to interlock along their contiguous horizontal edges, the panels 36 being formed to support a plurality of virtually flat bakery trays. The panels 36 are preferably formed by a metal extrusion and have integrally formed on their inner surfaces a plurality of virtually horizontal, rearwardly extending spaced pairs of ribs 38. The ribs forming each pair are spaced apart a sufficient distance to receive therebetween a flanged edge of a bakery tray 39 indicated in Fig. 4 by diagrammatic lines. The spaces between pairs of ribs are slightly greater than that between the ribs of each pair for the purpose of facilitating accurate, immediate, horizontal positioning of trays within the cabinet on the ribs 38.

The slight difference in the spacing of ribs 38 as above described is very important because it positively reduces to a minimum the possibility of introducing a tray in a slightly inclined position into the compartment. This spacing of ribs 38 provides a guide by which out of horizontal positioning of the tray is immediately recognized just prior to introduction of a tray into a compartment and thus frequent insertion and withdrawal of a tray to horizontally position the tray is obviated.

The upper portion of each panel 36 is formed with an inwardly offset edge 40 which is snugly accommodated within a longitudinally extending groove 41 formed in the bottom edge portion of an adjacent corresponding panel 36 or panel 37 for interlocking adjacent panels.

Panels 37 are of somewhat different extruded form. Panels 37 are employed in the cabinet side walls in horizontal zones wherein cross members 29 and bulkheads 28 divide the cabinet into separate compartments for extending between and connecting panels 36 forming the major portion of side walls of adjacent compartments. Each panel 37 is of less width than a panel 36 and is provided with a groove 41 along its bottom edge for interlocking engagement with an adjacent top offset edge of a panel 36. Along its upper edge portion, panel 37 is provided with an inwardly offset edge 40' for interlocking engagement with the groove in the bottom edge of an adjacent upper panel 36.

Each panel 37 is provided with an inwardly extending horizontal flange 42 formed adjacent its bottom edge and spaced below an adjacent cross member 29. The panel 37 may be provided with a central outwardly offset longitudinally extending portion.

The panels 36 and 37 may be secured to the webs of the adjacent posts 20 in any convenient manner, as by spaced rivets.

This panel construction of the side walls of the cabinet affords rigid side walls provided by ribs 38 integrally formed therewith on inner panel surfaces and by the interlocking of the adjacent panels wherein increased thickness of metal is provided. This arrangement of the side walls of the cabinet facilitates replacement of a panel in the event of damage which might prevent the introduction and positioning of a bakery tray within a compartment. Securing the panels 36 and 37 to the webs of the channel section posts 20 spaces the panels inwardly of the plane defined by the depending flanges of the bottom member and thus the bottom member provides bumper protection for the side walls of the cabinet.

A door 43 is provided for the opening to each compartment 27. Each door 43 comprises a virtually flat, thin, rectangular member of metal sheet or plate having inwardly extending peripheral flanges 44 affording a substantially rigid door construction. Each door 43 is supported from the cabinet in similar manner. Each door supporting means includes spaced hangers 45 at corners of a door opening, each hanger including a shank 47 which is positioned between flange 42 and the bottom edge of the panel 37 and secured to post 20 by suitable means as rivets 46. The shank 47 is offset inwardly at 48 and is provided with a forwardly extending upstanding portion 49 provided with an outer diagonal edge 50 and an inner vertical edge 52. Each door is provided with a transverse angle member 51 at each rear corner secured to rear flange 44 and presenting a portion lying parallel to the plane of the door for cooperative fulcruming engagement with the inner edge 52 of the upstanding portion 49 of the hanger 45 when the door is closed.

In closed position, the outer surface of the door lies in the same plane as that defined by the outer surfaces of the forward legs of front posts 20. The top portion of the door is held against outward movement by abutting engagement of members 51 against the inner edges 52 of hangers 45. The bottom flange of the door rests upon the horizontal leg 32 of cross member 29 and the inner edge of bottom flange 44 is positioned against lip 33 for determining the normal closed position of the door.

When the door is in normal closed position, means for holding and preventing movement of trays 39 include flat retaining straps 53 extending along the sides of each door inwardly of the side flanges thereof for abutting contact with front edges of the bakery trays 39. The straps 53 are secured at one end to member 51 and at the other end to the forward flange 44 in any suitable manner as by welding at 53a. Thus when the door is in closed position and locked, trays 39 are immovably held against movement within the compartment. Movement of bakery goods carried on the trays is minimized because the impact of a sliding tray against walls of the cabinet will free and cause to slide an article which would otherwise not move on the tray.

When the door 43 is moved to an upper overlying horizontal position within the cabinet about hangers 45, straps 53 rest upon the upper surface of the inwardly extending flanges 42 formed on panels 37 for supporting the door in a position which affords greatest economy of space within the compartment.

The diagonal edge 50 of the hanger together with the flange extension 26 affords clearance for turning of the door about the hanger in order to slide it into overhead position. When the door is in normal open position the bottom flange 44 of the door is arranged to lie in a plane flush with the outer surfaces of the posts 29 and is positioned by contact of the forward edges of hanger 45 with flange 44. The flush mounting of the door with respect to the front of the cabinet when the door is in both open and closed position affords an attractive arrangement of the cabinet. Such mounting of the door in open position permits utilization of an auxiliary display closure as described hereinafter.

Means for separately and independently locking each door 43 in closed position comprises a generally rectangular lock base member 55, Figs. 5 and 6, mounted in the central lower portion of each door. The base member 55 includes an inwardly extending annular boss 56 having a central bore therein through which extends a stub shaft 57. Adjacent to the boss 56 the stub shaft fixedly carries a circular disk 58 having a pair of oppositely directed arcuate slots 59, each slot 59 being formed about an independent axis radially spaced from the axis of the shaft 57 and with ends of each slot lying on opposite sides of the axis of shaft 57. Each slot 59 affords a track for a pin 60 formed on an adjacent end 62 of a locking rod 61, said end 62 being of semi-circular cross section, as indicated in Fig. 8. Each rod 61 extends transversely across the door and is slidably supported in an aperture 61a (Fig. 4) formed in side flange 44 of the door.

Inwardly of slotted disk 58 a flat circular washer 63 is held in contact with disk 58 by a spring washer 64, said spring washer being retained by a smaller washer 65 which is secured by a cotter pin 66, or other suitable means, extending through a port in the inner end of shaft 57.

The opposite end of shaft 57 is formed with a pair of flattened parallel faces 67 which are received between ears 68 formed centrally on an elongated horizontally disposed rectangular handle 69 pivotally connected to shaft 57 by a pin 69a. The ears 68 are of generally semicircular cross section and are received wherein an annular recess 70 formed in the outer surface of the lock base member 55, said door having a circular aperture 71 corresponding to the recess 70. This arrangement permits the handle 69 to lie in close overlying parallel relationship to the outer surface of the door when not in use, and yet may be readily grasped by pivoting the handle so that the plane of the handle is perpendicular to the plane of the door.

Aligned with each aperture 61a formed in the side flanges 44 of the door is a port 72a provided in the web of the adjacent front post 20 in order to receive the end of rod 61 when it is moved into its outermost position. The outer end of each locking rod 61 is provided with a transverse slot 72 which extends approximately halfway through the rod.

When it is desired to lock each door independently of the other doors, handle 69 may be rotated to turn shaft 57 and slotted disk 58. As the slotted disk is turned the cooperative engagement of pins 60 with the arcuate edges of slots 59 will cause the rods 61 to move axially outwardly away from the center of the door, the outer ends of rods 61 passing into the aligned ports 72a in posts 20. Rotation of disk 58 through approximately 180° will simultaneously move the rods to their outermost positions for locking the door. Rotation of the disk in an opposite direction retracts the rods by reason of the cooperative engagement of the pins with the arcuate slots 59 for unlocking the door.

Common securing and sealing means for all the doors in the cabinet to prevent opening during shipment is provided by a single locking bar 74 of angle section which is slidably mounted in vertical position between channel legs of the left front post 20. The bar 74 is provided with spaced slots 75, each terminating at one end in a circular aperture to receive the outer end of rod 61 when moved to outermost position. When the rods 61 are in locking position, slot 72 is aligned with the marginal edge of slot 75 and is adapted to slidably receive the marginal edge when the bar is moved downwardly for holding each rod 61 in extended position and thus locking all of the doors.

When the doors are in open position, the locking bar 74 is held by slidable interengagement of spaced slots 76 and guide buttons 77 mounted on the web of post 20.

Means for operating locking bar 74 is provided by a circular disk 78 having an eccentric transverse slot 79 (Figs. 3 and 4) accommodating a pin 80 which extends through the top portion of the locking bar 74 and the forward leg of the column of the post 20. The pin 80 may be carried by a circular member 82 provided with spaced lugs 83 receiving therebetween an end of an elongated rectangular locking handle 84 which is pivotally connected by a pin 85 to said lugs. Upon rotation of handle 84 in a plane generally parallel to disc 78 cooperative engagement of pin 80 and slot 79 will cause the locking bar to slidably move downwardly for positioning the marginal edges of the slot 75 in the slot 72 in each locking rod 61. Turning handle 84 in a reverse direction will move bar 74 upwardly for releasing rods 61.

The lower end of handle 84 may be received between spaced lugs 87 formed on post 20, said lugs and said handle being provided with aligned transverse bores to permit insertion therethrough of a wire element for sealing and locking of the doors, or a suitable locking device, such as a padlock may be inserted therethrough for locking the doors in closed position.

It will be apparent that when the doors are closed and the rods 61 have been moved outwardly into cooperative interlocking engagement with the front posts, the ends 61 projecting through the left front posts 20 are simultaneously engaged by movement of the locking bar 74 for securing all of the doors. The locking bar 74 is protected by its mounting between the legs of the channel section post from damage during transit.

In order to permit each door to be raised to overhead position, each locking rod 61 is provided with a relatively wide, transversely extending slot 88 formed inwardly of slot 72 for loosely receiving the diagonal edge 50 of the hangers 45 in order to permit the locking rods 61 to pass over and behind the upstanding portion 49. It will be apparent that when the door is in horizontal position, the lower edge of rod 61 is positioned slightly below the top edge of the upstanding portion 49 in order to prevent accidental movement of the door outwardly from its horizontal open position.

Ventilation for the cabinet is provided by outwardly bent portions 90 formed on side depending flanges of the top plate and spaced as at 90a from the adjacent top portion of panel 37, spacer pads 91 being provided between the outwardly bent portions 90 and the panels 37. Introduction of air into the cabinet is thus provided by spaces 90a and the air may circulate through the interior of the cabinet when the doors are closed by flowing along the side and rear walls and through the lightening openings in the bulkheads 28. The goods are thus maintained in a fresh and salable condition within the cabinet during delivery even though the doors of the cabinet are closed and locked.

Means for locking adjacent cabinets together in a unitary assembly for transportation or display purposes thereof may be provided by a plurality of U-shaped clips 92 (Figs. 12 and 13), the spaced legs 93 of which are adapted to be accommodated within top open ends of posts 20 enclosed by spacer members or bumpers 94 fitted on the top ends of said columns. It will be readily apparent that the spacer legs may be dropped into the adjacent top open ends of the posts when the cabinets are placed in aligned relationship for holding the cabinets together and may be readily removed for separating one cabinet from another cabinet by merely lifting the U-shaped members upwardly and out of the open ends of the posts.

Each spacer member 94 is provided with a side wall 95 having an outer surface which lies in the same plane as the outer surface of the depending flange of the base plate so that when the cabinets are aligned in abutting relationship play between the cabinets is reduced to a minimum and a row of cabinets may be held together as a unit.

In Figs. 11 and 11a are shown an auxiliary, transparent closure 97 which is adapted to be removably mounted at the side of the door opening of each compartment for displaying the goods therewithin while affording protection thereto from dust, dirt, or other foreign particles. The flat rectangular transparent closure 97 is made of any suitable transparent material, preferably an unbreakable material such as Lucite, Plexiglas or the like and carried in a metal rectangular frame 98 of U cross-section. Attached to the metal frame 98 at one side of closure 97 is a hinge 99 which may be connected to a vertical edge of an elongated plate 100 adapted to lie against the inner face of the adjacent post 20 (the right post in Fig. 11). The plate 100 is provided with buttons 101 having enlarged heads spaced from the plate and receivable within upper enlarged ports of respective key slots 102. When the door is dropped downwardly the buttons lock with the lower portion of slots 102. The closure 97 is thus removably mounted in the door opening when the metal door 43 is moved to overhead position by merely positioning the hinged edge of the door against the key slotted post 20, engaging the buttons and the key slots, and permitting the door to drop slightly for securement thereof. The closure 97 is thus supported in the door opening with its outer face virtually flush with the plane defined by the outer surface of the posts 20.

It is important to note that the interlocking panel construction of the side walls of the cabinet construction described above facilitates the fabrication and manufacture of cabinets having compartments of varying height so that a single, double, or other multiple compartment cabinet may be readily and easily provided. Variations in the height of the compartments are readily accomplished by adding or subtracting panels 36 or 37 in assembly of the side wall structure. While the illustration shows an arrangement of two panels 36 assembled on opposite sides of a panel 37, it is obvious that more than two panels 36 may be assembled in interlocking relationship before employment of a compartment defining panel 37. Since the panels are formed by metal extrusion and are readily adapted to be assembled in adjacent interlocking relationship, the advantage of this construction in the fabrication of varying multiple compartment cabinets is obvious.

It will thus be readily apparent to those skilled in the art that an improved cabinet construction has been provided by this invention which is attractive, lightweight, easily portable, and readily utilized for facilitating transportation and display of bakery goods which must be carefully handled. The spacing of the ribs 38, as described above, has been arranged so that when a tray of bakery goods is inserted into the cabinet, the position of the tray with respect to horizontal will become readily apparent and quickly recognized by the party inserting the tray. It should also be noted that the trays are automatically held by the doors in non-slidable and fixed position by the doors when the doors are locked for delivery of the bakery goods contained in the cabinet. The common securing means for locking all of the doors and the arrangement of the operable handle for the securing means with the spacer lugs on the post 20 provides a sealing means for readily determining whether or not the doors to the cabinet have been opened by unauthorized persons.

It will be understood by those skilled in the art that various modifications or changes may be made in the embodiment of the invention illustrated above and that all such changes and modifications coming within the scope of the appended claims are embraced thereby.

I claim:

1. A lightweight cabinet construction for transporting and displaying bakery goods comprising: top and bottom flat, horizontal, rectangular plates having depending peripheral flanges, said bottom plate being of greater width than said top plate and presenting sidewardly extending marginal portions; front and rear posts of channel section supported on said marginal portions and connected to depending flanges of said top plate, the channels of said posts opening sidewardly to form longitudinally extending hand holds; a rear wall connected to said rear posts; side walls connected respectively to said front and rear posts, each side wall comprising extruded compartment panels having integrally formed pairs of horizontal inwardly extending spaced tray-supporting ribs, and extruded connecting panels at selected spaced intervals having top and bottom edges interlocked with adjacent compartment panels, each of said connecting panels having an inwardly extending horizontal rib adapted to support a door in overhead horizontal open position; horizontal bulkheads connected to and extending between opposite connecting side panels to define compartments in said cabinet; cross bars connecting front posts in the horizontal zones of the connecting panels and defining with the front posts front openings to said compartments; a flat door hung from said connecting panels and having an inwardly spaced vertical strap along each side edge adapted to contact and immovably hold trays carried within said compartments when said door is closed; a second channel member carried at the top of each post, web portions of the second channels on each side lying in the vertical plane of the depending flanges of the bottom plate, whereby said bottom peripheral flanges and said web portions provide bumper means for contact of a plurality of cabinets in adjacent side-by-side relation; said web portions being adapted to cooperate with a coupling device for tightly holding adjacent cabinets in side-by-side relation.

2. A lightweight cabinet construction for transporting and displaying bakery goods comprising: top and bottom flat, horizontal, rectangular plates having depending peripheral flanges, said bottom plate being of greater width than said top plate and presenting sidewardly extending marginal portions; front and rear posts of channel section supported on said marginal portions and connected to depending flanges of said top plate, the channels of said posts opening sidewardly to form longitudinally extending hand holds; a rear wall connected to said rear posts; side walls connected respectively to said front and rear posts, each side wall comprising extruded compartment panels having integrally formed pairs of horizontal inwardly extending spaced tray-supporting ribs, and extruded connecting panels at selected spaced intervals having top and bottom edges interlocked with adjacent compartment panels, each of said connecting panels having an inwardly extending horizontal rib adapted to support a door in overhead horizontal open position; horizontal bulkheads connected to and extending between opposite connecting side panels to define compartments in said cabinet; cross bars connecting front posts in the horizontal zones of the connecting panels and defining with the front posts front openings to said compartments; a flat door hung from said connecting panels and having an inwardly spaced vertical strap along each side edge adapted to contact and immovably hold trays carried within said compartments when said door is closed; and a second channel-like member carried at the top of each post, web portions of the channel-like members on each side lying in the vertical plane of the depending flanges of the bottom plate, whereby said bottom peripheral flanges and said web portions provide bumper means for contact of a plurality of cabinets in adjacent side-by-side relation.

3. A lightweight cabinet construction for transporting and displaying bakery goods comprising: top and bottom flat, horizontal, rectangular plates having depending peripheral flanges, said bottom plate being of greater width than said top plate and presenting sidewardly extending marginal portions; front and rear posts of channel section supported on said marginal portions and connected to depending flanges of said top plate; a rear wall connected to said rear posts; side walls connected respectively to said front and rear posts, each side wall comprising interlocked extruded compartment panels having integrally formed pairs of horizontal inwardly extending spaced tray-supporting ribs, and extruded connecting panels at selected spaced intervals having top and bottom edges interlocked with adjacent compartment panels, said connecting panels having an inwardly extending horizontal rib adapted to support a door in overhead open position; horizontal bulkheads connected to and extending between opposite connecting side panels to define compartments in said cabinet; cross bars connecting front posts in the horizontal zones of the connecting panels and defining with the front posts front openings to said compartments; a flat door hung from said connecting panels; a second channel-like member carried at the top of each post, web portions of each of the second channel-like members on each side lying in the vertical plane of the depending flanges of the bottom plate, whereby said bottom peripheral flanges and said web portions provide bumper means for contact of a plurality of cabinets in adjacent side-by-side relation; said web portions being adapted to cooperate with a coupling device for tightly holding adjacent cabinets in side-by-side relation.

4. A lightweight cabinet construction for transporting and displaying bakery goods comprising: top and bottom flat, horizontal, rectangular plates having depending peripheral flanges, said bottom plate being of greater width than said top plate and presenting sidewardly extending marginal portions; front and rear posts of channel section supported on said marginal portions and connected to depending flanges of said top plate; a rear wall connected to said rear posts; side walls connected respectively to said front and rear posts, each side wall comprising extruded compartment panels having integrally formed pairs of horizontal inwardly extending spaced tray-supporting ribs, and extruded connecting panels at selected spaced intervals having top and bottom edges interlocked with adjacent compartment panels, said connecting panels having an inwardly extending horizontal rib adapted to support a door in overhead horizontal open position; cross bars connecting front posts in the horizontal zones of the connecting panels and defining with the front posts front openings; a flat door hung from said connecting panels; and a second channel-like member carried at the top of each post, web portions of the channel-like members on each side lying in the vertical plane of the depending flanges of the bottom plate.

5. A lightweight cabinet construction for transporting and displaying bakery goods, comprising: top and bottom flat rectangular walls having depending peripheral flanges, said bottom wall being of greater width than said top wall and presenting sidewardly extending marginal portions; front and rear posts supported on said marginal portions and connected to the depending flanges of said top wall; a rear wall connecting said rear posts; side walls connecting said front and rear posts and comprising a plurality of selectively arranged extruded compartment panels, each having integrally formed pairs of inwardly extending spaced tray supporting ribs, the spacing between pairs of said ribs being greater than the spacing between ribs of each pair for facilitating virtually horizontal insertion of trays into said cabinet on corresponding opposed ribs, each side wall including extruded connecting panels at selected spaced intervals having top and bottom edges interlocked with adjacent compartment panels, each connecting panel having an inwardly extending horizontal rib adapted to support a door in overhead horizontal open position; cross bars connecting front posts in the horizontal zones of the connecting panels and defining with the front posts front openings; and a flat door hung from said connecting panels and slidably movable upon said horizontal ribs into said open position.

6. In a lightweight cabinet construction including top and bottom walls connected by front and rear posts, a rear wall and spaced cross bars connecting the front posts for defining therewith front openings to compartments of the cabinet construction, the combination of: side walls comprising a plurality of extruded compartment panels selectively arranged in groups, each group forming a side wall for each compartment, each compartment panel having integrally formed sets of at least two horizontal inwardly extending spaced ribs, each set of ribs being spaced apart a distance greater than the spacing of the ribs of each set and defining readily observable sets of ribs to facilitate virtually horizontal positioning of trays within said compartments; said extruded compartment panels being formed with integral means on top and bottom edges thereof for interlocking adjacent compartment panels; said side walls including panels connecting said groups of compartment panels at selected spaced intervals and having means on top and bottom edges thereof adapted to interlock with the means on the adjacent compartment panels, each connecting panel having an inwardly extending horizontal rib adapted to support a door in overhead open position, and means on said connecting panels for hanging a door therefrom.

7. A side wall construction for a cabinet having top and bottom walls, a rear wall, front and rear posts connecting said top and bottom walls and spaced cross bars defining an opening to a compartment formed by the cabinet, comprising: at least one extruded compartment panel having a plurality of integrally formed sets of at least two horizontal inwardly extending spaced ribs, each set of ribs being spaced apart a distance greater than the spacing of the ribs of each set, whereby horizontal positioning of trays on ribs of opposed sets on opposite side walls of the compartment is facilitated; and extruded connecting panels above and below the extruded compartment panel, each connecting panel having an inwardly extending horizontal rib adapted to support a door in horizontal overhead open position and having means for positioning said door thereon in vertical position in said opening; and integral extruded means on top and bottom edges of the compartment panel cooperatively interlocked with corresponding extruded integral means on the adjacent top and bottom edges of the connecting panels.

ALBIN K. PETERSON.

References Cited in the file of this patent

UNITED STATES PATENTS

| Number | Name | Date |
|---|---|---|
| 497,406 | Du Bois | May 16, 1893 |
| 1,207,595 | Miller | Dec. 5, 1916 |
| 1,477,056 | Hager | Dec. 11, 1923 |
| 1,873,485 | Rowe | Aug. 23, 1932 |
| 2,138,560 | Stuart | Nov. 29, 1938 |
| 2,241,884 | Noble | May 13, 1941 |
| 2,503,599 | Smayda | Apr. 11, 1950 |
| 2,532,942 | Reimer | Dec. 5, 1950 |